United States Patent
Grigore et al.

(10) Patent No.: US 12,409,864 B2
(45) Date of Patent: Sep. 9, 2025

(54) METHODS AND SYSTEMS FOR LONG-TERM TRAJECTORY PREDICTION BY EXTENDING A PREDICTION HORIZON

(71) Applicant: FORD GLOBAL TECHNOLOGIES, LLC, Dearborn, MI (US)

(72) Inventors: Elena Corina Grigore, Redwood City, CA (US); Andrew Hartnett, West Hartford, CT (US); Jagjeet Singh, Pittsburgh, PA (US); Constantin Savtchenko, Sewickley, PA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 317 days.

(21) Appl. No.: 18/160,385

(22) Filed: Jan. 27, 2023

(65) Prior Publication Data

US 2024/0253667 A1 Aug. 1, 2024

(51) Int. Cl.
*B60W 60/00* (2020.01)
*B60W 40/04* (2006.01)

(52) U.S. Cl.
CPC ........ *B60W 60/0027* (2020.02); *B60W 40/04* (2013.01); *B60W 2554/80* (2020.02)

(58) Field of Classification Search
CPC ............. B60W 60/0027; B60W 40/04; B60W 2554/80
See application file for complete search history.

(56) References Cited

U.S. PATENT DOCUMENTS

| | | | |
|---|---|---|---|
| 2015/0112548 A1* | 4/2015 | D'Amato | B60W 40/072 701/36 |
| 2016/0288787 A1* | 10/2016 | Kraehling | B60W 30/0953 |
| 2020/0294323 A1* | 9/2020 | Zeng | G07C 5/085 |
| 2022/0105959 A1* | 4/2022 | Hartnett | B60W 50/0097 |
| 2022/0185326 A1 | 6/2022 | Isele et al. | |

(Continued)

FOREIGN PATENT DOCUMENTS

| | | | |
|---|---|---|---|
| EP | 3855120 A1 | 7/2021 | |
| JP | 2023151654 A | * 10/2023 | B60W 30/09 |

OTHER PUBLICATIONS

Brudigam et al., "Model Predictive Control with Models of Different Granularity and a Non-uniformly Spaced Prediction Horizon," 2021 American Control Conference (Aug. 2021), available at https://arxiv.org/pdf/2108.08014.pdf (6 pages).

(Continued)

*Primary Examiner* — Calvin Cheung
(74) *Attorney, Agent, or Firm* — Frank A. MacKenzie; Brooks Kushman P.C.

(57) ABSTRACT

Systems and methods for planning a trajectory for a vehicle are disclosed. The methods include generating first predicted states of an object in an environment of the vehicle at one or more first time steps during a first prediction horizon using a machine learning model and sensor data about the environment. The first predicted states are used as an input to a physical model to generate second predicted states of the object at one or more second time steps during a second prediction horizon where the one or more second time steps are after the one or more first time steps. A trajectory for the vehicle is generated using the first predicted states or the second predicted states of the object.

20 Claims, 5 Drawing Sheets

(56) References Cited

U.S. PATENT DOCUMENTS

2023/0322214 A1* 10/2023 Katayama ............. B60W 30/09
                                                                                701/301

OTHER PUBLICATIONS

Nowadly et al., "Using Machine Learning Approaches to Improve Long-Range Demand Forecasting," Submitted to the Program in Supple Chain Management on May 8, 2020, available at https://dspace.mit.edu/bitstream/handle/1721.1/126503/scm2020-nowadly-using-machine-learning-approaches-to-improve-long-range-demand-forecasting-capstone.pdf?sequence=1&isAllowed=y (71 pages).

Gaudet et al., "Learning Accurate Extended-Horizon Predictions of High Dimensional Trajectories," (Jan. 2019) available at https://arxiv.org/pdf/1901.03895.pdf (9 pages).

* cited by examiner

METHODS AND SYSTEMS FOR LONG-TERM TRAJECTORY PREDICTION BY EXTENDING A PREDICTION HORIZON

BACKGROUND

Successful design and deployment of autonomous vehicles (AV) requires the ability to accurately forecast and/or predict future trajectories of objects around the AV because control decisions must be made with respect to the future state of the AV's environment. Such objects may include stationary objects or moving objects (i.e., actors) in the environment of the AV. Various AV systems monitor the surroundings of the AV, decide whether collision with an object can occur, and maneuver the AV to avoid a collision. Typically, forecasting the trajectory of an agent includes a structured (sequential) prediction analysis by learning a model for behavior from a data set of example trajectories-such as a data set of manually driven or observed trajectories, and using the model for forecasting trajectories.

Existing models for forecasting have a limited length of prediction horizon of about 4 to 8 seconds into the future (e.g., when the training data set includes trajectories of certain time length). However, various motion planning models require longer horizon lengths (e.g., about 10 seconds) for forecasting motion of objects.

This document describes methods and systems that are directed to addressing the problems described above, and/or other issues.

SUMMARY

In one or more scenarios, methods and systems for planning a trajectory for a vehicle are disclosed. The methods may include generating first predicted states of an object in an environment of the vehicle at one or more first time steps during a first prediction horizon using a machine learning model and sensor data about the environment. The first predicted states may then be used as an input to a physical model to generate second predicted states of the object at one or more second time steps during a second prediction horizon where the one or more second time steps are after the one or more first time steps. A trajectory for the vehicle may be generated using the first predicted states or the second predicted states of the object.

Implementing systems of the above-described methods can include, but are not limited to, a processor and a non-transitory computer-readable storage medium comprising programming instructions that are configured to cause the processor to implement a method for generating trajectories. Optionally, the programming instructions may be included in a computer program product.

DETAILED DESCRIPTION

This document describes system, apparatus, device, method and/or computer program product embodiments, and/or combinations and sub-combinations of any of the above, for extending the forecasting horizon for predicting the motion of objects in an AV's environment.

AV control systems rely on a complex system of sensors to detect, classify, and predict actions of other objects in the environment. Specifically, an AV will consider the likely trajectories of other objects when planning a path for the AV and/or initiating a reactive measure in response to the other object.

Prediction provides an estimate of future world state, which can be used to plan an optimal path for the AV through a dynamic traffic environment. Physical models usually use dynamic and kinematic models to anticipate the propagation of a situation, such as a state of the moving object. For example, the current state (e.g., position, speed, acceleration) of object around an AV can be estimated using techniques such as a Kalman filter (KF). Specifically, a common approach for short time horizon predictions of future motion of objects is to assume that the object will not change any control inputs (i.e., a constant velocity with no changed in steering, accelerator, etc.) such that the object's current estimated state can be propagated over time using a heuristically coded physical model (e.g., a dynamic motion model or kinematic model) that captures the underlying kinematics to predict future trajectory. Physical models are mathematical models that describe the motion of objects, regardless of force. The AV can use a physical model to predict the object's position and orientation over time in view of various parameters. The AV may select a physical model that is appropriate for the other object. However, because physical models tend to focus on the motion properties, they are typically not applied to predict variations in the moving object's motion caused by special maneuvers such as various acceleration, various speed, slow down then speed up to overtake, etc. Specifically, for longer time horizons (e.g., more than a few seconds) the performance of this approach degrades as the underlying assumption of constant controls becomes increasingly unlikely.

An alternative to a heuristic physical model is a machine learning (e.g., neural network, deep learning, or the like) forecasting or motion prediction model learned from training data sets. For generating predictions and forecasting trajectories, the task for the model may be framed as: given the past input coordinates of a vehicle trajectory Vi as $Xi=(x_i^t, y_i^t)$ for time steps $t=\{1, \ldots, Tobs\}$, predict the future coordinates $Yi=(x_i^t, y_i^t)$ for time steps $t=\{Tobs+1, \ldots, Tpred\}$, $\{1, \ldots, Tobs\}$ being time step(s) where the vehicle trajectory/state was observed and/or determined based on sensor data; and $\{Tobs+1, \ldots, Tpred\}$ being time steps where the vehicle trajectory/state is predicted by the machine learning model based on the observations. However, such models generally require tremendous amount of computational cost and may overlook the merits given by physics-based approach. Moreover, as discussed above, the prediction horizon of machine learning models depends on the length of the trajectories included in the datasets used during training; AND such models typically split the available trajectories into past history and ground truth trajectories to perform training. As such, the longer the prediction horizon of a machine learning model, the longer the full trajectories in the dataset need to be. In other words, developing machine learning models with longer prediction horizons requires datasets with longer trajectories (which are generally not available and more difficult to create) and any changes in the prediction horizon length requires re-training the model on trajectories of correct length. Finally, this method involves a great deal of computation to provide end-to-end motion planning in real-time on-board a vehicle.

In order to generate a trajectory for an AV, predictions about the state of an environment over a longer prediction horizon (e.g., about 8-12 seconds) may be needed. This disclosure describes the consecutive use of two different models (a deep learning model and a heuristic physical model) over a longer prediction horizon by dividing the prediction horizon into two segments, for determining a trajectory of an object. Specifically, a deep learning model outputs over a first prediction horizon (i.e., predicted future states at different time steps during the first prediction horizon) are used as input for a physical model for a consecutive prediction horizon (i.e., predicted future states at different time steps during the second consecutive prediction horizon) to yield future states of an object over an overall longer prediction horizon. While prior art models may be retrained to improve prediction horizons, this also results in increased computational effort resulting in infeasibility of deployment on-board an AV for real-time use. Optionally, the disclosure allows for integration of deep forecasting predictions alongside the physical models into vehicle on-board computing device to enable longer term predictions on the AV itself.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to." Definitions for additional terms that are relevant to this document are included at the end of this Detailed Description.

Notably, this document describes the present solution in the context of an AV. However, the present solution is not limited to AV applications. The present solution may be used in other applications such as robotic applications, radar system applications, metric applications, and/or system performance applications. Furthermore, the present solution can be used for extending the prediction horizon for applications other than object state or trajectory predictions.

Figure 1:
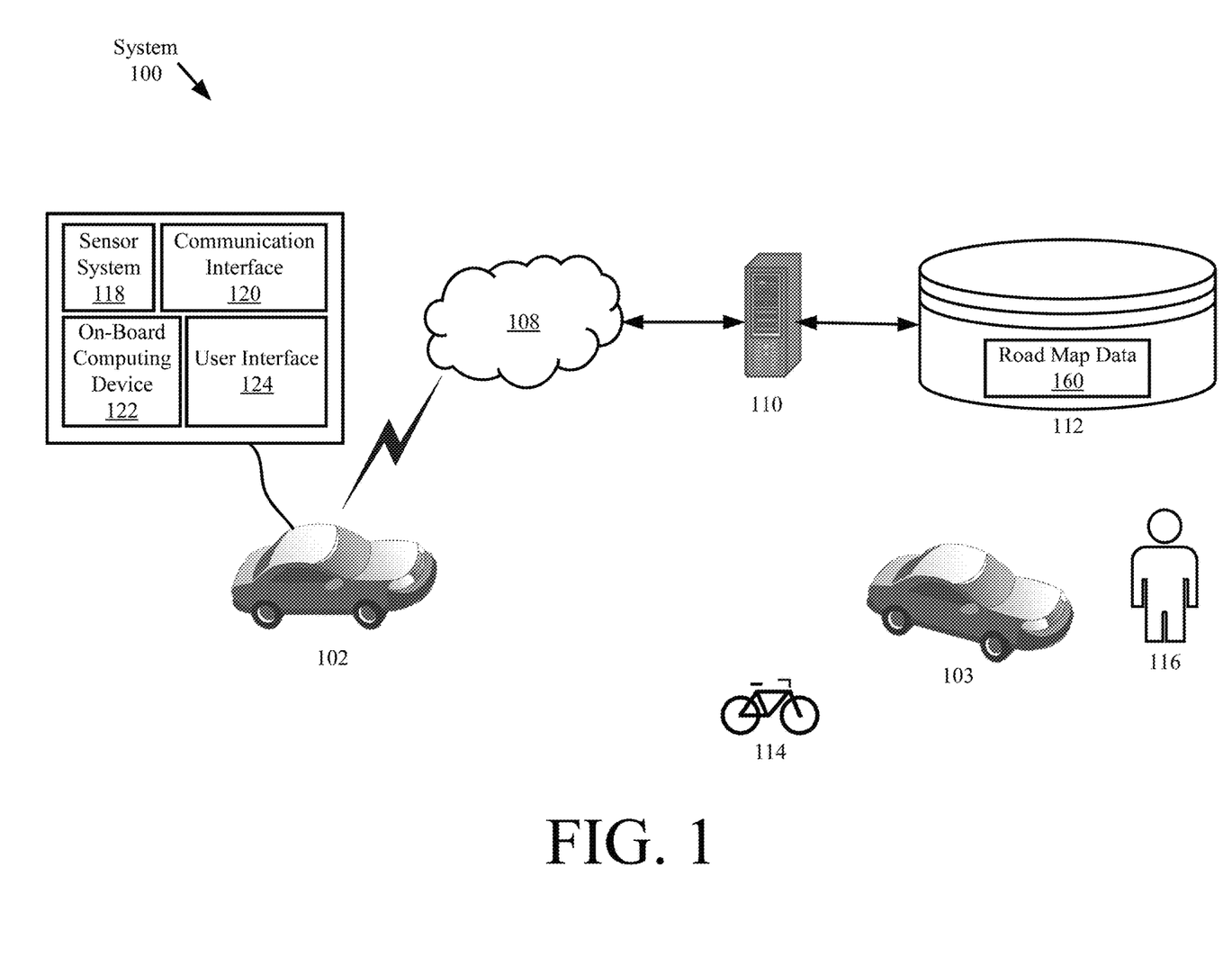
FIG. 1 illustrates an example system that includes an autonomous vehicle.

FIG. 1 illustrates an example system 100, in accordance with aspects of the disclosure. System 100 comprises a vehicle 102 that is traveling along a road in a semi-autonomous or autonomous manner. Vehicle 102 is also referred to in this document as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include, but are not limited to, a vehicle 103, cyclist 114 (such as a rider of a bicycle, electric scooter, motorcycle, or the like) and/or a pedestrian 116.

The AV 102 may include a sensor system 118, an on-board computing device 122, a communications interface 120, and a user interface 124. Autonomous vehicle system may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

The sensor system 118 may include one or more sensors that are coupled to and/or are included within the AV 102. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to a remote computing device 110 (for example, a cloud processing system) over communications network 108. Remote computing device 110 may be configured with one or more servers to perform one or more processes of the technology described in this document. Remote computing device 110 may also be configured to communicate data/instructions to/from AV 102 over network 108, to/from server(s) and/or datastore(s) 112. Datastore(s) 112 may include, but are not limited to, database(s).

Network 108 may include one or more wired or wireless networks. For example, the network 108 may include a cellular network (for example, a long-term evolution (LTE) network, a code division multiple access (CDMA) network, a 1G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from datastore 112. Datastore 112 may be configured to store and supply raw data, indexed data, structured data, road map data 160, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface system 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

Figure 2:
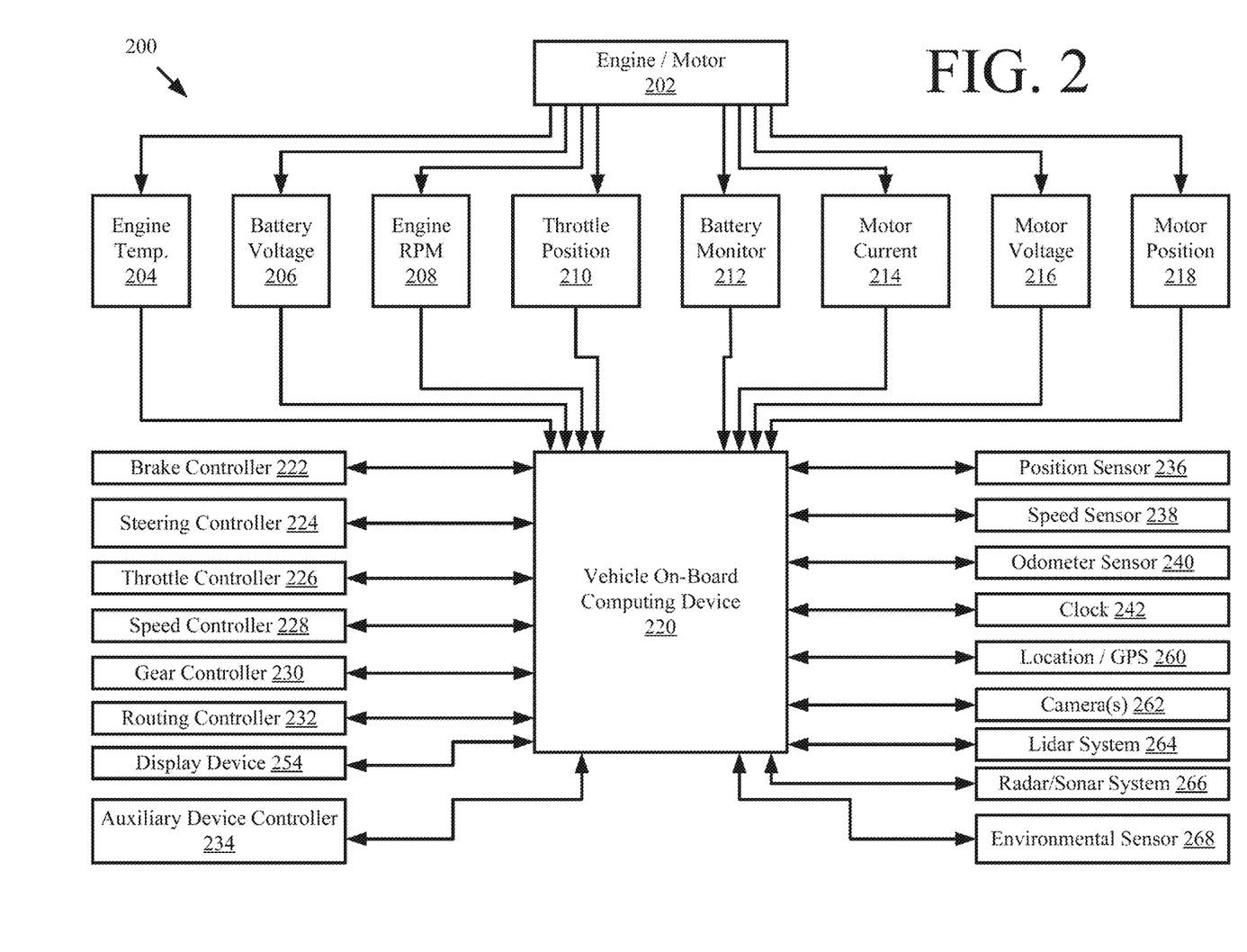
FIG. 2 illustrates example systems and components of an autonomous vehicle.

FIG. 2 illustrates an example system architecture 200 for a vehicle, in accordance with aspects of the disclosure. Vehicles 102 and/or 103 of FIG. 1 can have the same or similar system architecture as that shown in FIG. 2. Thus, the following discussion of system architecture 400 is sufficient for understanding vehicle(s) 102, 103 of FIG. 1. However, other types of vehicles are considered within the scope of the technology described in this document and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 for a vehicle includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine revolutions per minute (RPM) sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 260 (such as a Global Positioning System (GPS) device); object detection sensors such as one or more cameras 262; a lidar system 262; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using a computer system such as that illustrated in FIG. 5. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 234 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 254 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In various embodiments, the vehicle on-board computing device 220 may determine perception information of the surrounding environment of the AV. Based on the sensor data provided by one or more sensors and location information that is obtained, the vehicle on-board computing device 220 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 220 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 220 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 220 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information).

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In various embodiments, the vehicle on-board computing device 220 may determine a motion plan for the autonomous vehicle. For example, the vehicle on-board computing device 220 may determine a motion plan for the autonomous vehicle based on the perception data and/or the prediction data. Specifically, given predictions about the future locations of proximate objects and other perception data, the vehicle on-board computing device 220 can determine a motion plan for the AV that best navigates the autonomous vehicle relative to the objects at their future locations.

In some embodiments, the vehicle on-board computing device 220 may receive predictions and make a decision regarding how to handle objects and/or objects in the environment of the AV. For example, for a particular object (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the AV to travel on a given route, as well as driving parameters (for example, distance, speed, and/or turning angle). That is, for a given object, the vehicle on-board computing device 220 decides how to act or react with respect to the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the autonomous vehicle is generated for execution. The vehicle on-board computing device 220 may for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
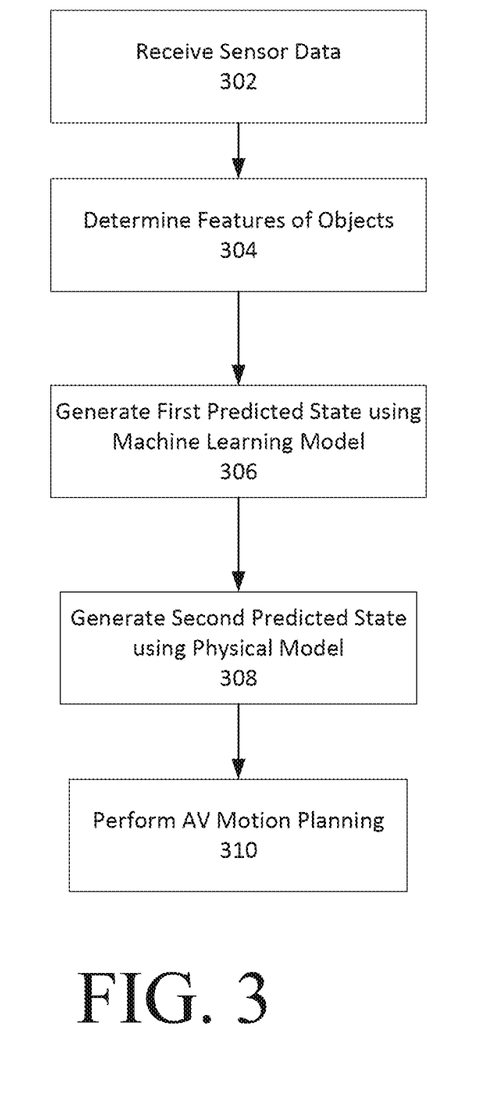
FIG. 3 illustrates a flowchart of an example method for predicting the future state of an object.

Referring now to FIG. 3, a flowchart corresponding to an example method for predicting the future trajectories (and/or states) of one or more objects in an AV's environment is illustrated. The order in which the operations are described is not intended to be construed as a limitation, and any number of the described blocks can be combined in any order and/or in parallel to implement the processes. In some embodiments, one or more blocks of the process can be omitted entirely.

At 302, the system may receive sensor data, at least a portion of the sensor data being associated with an environment of an AV. The sensor(s) can gather sensor data (e.g., image data, RADAR data, LIDAR data, etc.) associated with the surrounding environment of the AV. For example, the sensor data can include LIDAR point cloud(s) and/or other data associated with one or more object(s) that are proximate to the AV (e.g., within a field of view of the sensor(s)) and/or one or more geographic characteristics of the geographic area (e.g., curbs, lane markings, sidewalks, etc.). The object(s) can include, for example, other vehicles, pedestrians, bicycles, etc. The sensor data can be indicative of characteristics (e.g., locations) associated with the objects(s) at one or more times. The sensor(s) can provide such sensor data to the system.

In addition to the sensor data, the system can retrieve or otherwise obtain other types of data associated with the geographic area in which the object(s) and/or the AV are located. For example, the system can obtain map data that provides detailed information about the surrounding environment of the AV. The map data can provide information regarding: the identity and location of different roadways, road segments, buildings, sidewalks, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); the location of obstructions (e.g., roadwork, accident, etc.) and/or any other map data that provides information that assists the system in comprehending and perceiving its surrounding environment and its relationship thereto. In some implementations, the system can obtain satellite imagery of the geographic area (e.g., overhead imagery) in which the object(s) and/or the AV are located.

At 304, the system, based on the sensor data and/or the map data, may determine one or more feature(s) associated with an object. For example, the system can perform agent detection, segmentation, classification, and/or state determination based at least in part on sensor data received from the sensor system(s), using any now or hereafter known techniques. The state can be indicative of at least a current and/or past state of an object that is within the surrounding environment of the AV. For example, the state data for each object can describe an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other state information. For example, the current and/or past state of an object may be determined using a detection and tracking algorithm.

Optionally, the system may also determine a feature associated with an object that includes a reference path for the object. In some embodiments, the reference path may be determined by examining (a) lane geometry (e.g., a centerline of a lane), (b) current state of the object (such as where the object is in the lane), and (c) positions of other objects or obstacles in the road. Different types of objects may have different reference paths, and the system may determine a reference path that corresponds to a determined class of the object. Methods for generating a reference path for an object, and using the reference paths to predict object trajectories are described in U.S. patent Application Publication No. 2022/0266874, the disclosure of which is incorporated herein by reference in its entirety.

Next, at 306, the system may predict, using a machine learning model and the one or more features of a detected object, a first future state of the detected object over a first prediction horizon ($T1=t_0 \rightarrow t_1$), $t_0$ being a time when limited or no sensor data is available about an object (and/or a current time) and $t_1$ being a time offset into the future from $t_0$. Optionally, the first future state may be determined based on an object's predicted trajectory during the time period T1, and may include one or more predicted future locations, velocity, heading, acceleration, etc. and/or a predicted path or trajectory associated with each object at the end of the first prediction horizon (i.e., at $t_1$) and/or at each time step $t_0+1, t_0+2 \ldots t_0+1$. As discussed above, the task for the model may be framed as: given the past input coordinates of a vehicle trajectory Vi as $Xi=(x^t_i, y^t_i)$ for time steps $t=\{1, \ldots, Tobs\}$ (determined using the current and past states that were observed), predict the future coordinates $Yi=(x^t_i, y^t_i)$ for time steps $t=\{Tobs+1, \ldots, Tpred\}$. For instance, the system can be configured to predict a motion or trajectory of the object(s) within the surrounding environment of the AV. Optionally, the machine learning model may predict a continuous future trajectory and determines a probability that the future trajectory would be taken, given measured state data. Specifically, the system can create predicted state data associated with one or more of the objects that is indicative of one or more predicted future locations and/or a predicted path or trajectory associated with each object. The predicted path can be indicative of a trajectory along which the respective object is predicted to travel over time (and/or the speed at which the object is predicted to travel along the predicted path). In some implementations, the future state can also, or alternatively, indicate a predicted heading, speed, and/or bounding shape associated with the object.

To help generate such predictions, the prediction system can include, employ, and/or otherwise leverage a model. In particular, the model can be a trained machine learning model. For example, the trained machine learning model can be or can otherwise include one or more various model(s) such as, for example, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks.

In various embodiments, any now or hereafter known training techniques can be performed to train the model to predict one or more future state of object(s). The value of T1 may be decided such that it is long enough to have value beyond physical models while being short enough to be within desired computation efficiency requirements. For example, the training data set(s) for training the model may include time series with lengths of about 4-12 seconds (referring to the full length of the trajectories, which get split into past history and ground truth during training), and hence the model may have a prediction horizon (T1) equal to the time series length minus the past history length (e.g., 3-second prediction horizon for a dataset with 4-second trajectories and 1-second past history, 11-second prediction horizon for a dataset with 12-second trajectories and 11-second past history, etc.). However, other time periods are within the scope of this disclosure. An example of a model and model training is described in U.S. Pat. No. 11,131,993, the disclosure of which is incorporated into this document by reference.

Optionally, the model may be trained and/or selected based on one or more features of the detected objects such as, without limitation, the object type, motion category (e.g., stationary, constant speed, acceleration, or deceleration), type of the environment (e.g., intersection, freeway, etc.), or the like for predicting the first future state of the object. For example, the system may include a library of machine learning for storing any number of trained machine learning models, each of which is associated with one or more classes (i.e., actor types) such as pedestrian, bicyclist, automobile, tractor-trailer, etc.

Next, the predicted future state of the actor at $t_1$ (and/or the one or more features of the object) may be used as an input to a physical model (or "actor model") to generate a final predicted state over a consecutive second prediction horizon ($T2=t_1 \rightarrow t_2$), for use by a motion planning system of the AV (308), $t_2$ being a time further offset into the future from $t_1$. The final predicted state may include one or more predicted future locations, velocity, heading, acceleration, etc and/or a predicted path or trajectory associated with each object at the end of the second prediction horizon (i.e., at $t_2$) and/or at each time step $t_1+1, t_1+2 \ldots t_1+t_2$. In various embodiments, the second prediction horizon (T2) may be about 3-6 seconds, about 4-5 seconds, or the like. As such, the total prediction horizon according to the principles of this disclosure is T=T1+T2, T being about 8-15 seconds, about 9-14 seconds, about 10-13 seconds, about 11-12 seconds, or the like.

In various embodiments, examples of inputs provided to the physical model at each time step can include, without limitation, a classification of an object, a predicted path, the type of physical model, map data (e.g., lateral offset, predicted distance to conflict, etc.), predicted speed, constraints, predicted location, current location in predicted path, upcoming predicted goals (e.g., brake target, upcoming speed targets), time predicted so far, or the like.

Each physical model will receive predicted state of the object at $t_1$, as well as a proposed reference path of the actor to output a future predicted state for the object at $t_2$. In some embodiments, the reference path may be determined by examining (a) lane geometry, (b) the state of the object (such as where the object is in the lane) at $t_1$, and (c) positions of other objects or obstacles in the road. Optionally, the reference path may be the path predicted by the machine learning model in step 306.

As discussed above, physical models represent actors as dynamic entities governed by the laws of physics. Future motion is predicted using dynamic and kinematic models linking some control inputs (e.g. steering, acceleration), actor properties (e.g. weight) and external conditions (e.g. friction coefficient of the road surface) to the evolution of the state of the actor (e.g. position, heading, speed). The system may include a library of physical models for storing any number of physical models, each of which is associated with one or more classes (i.e., actor types) such as pedestrian, bicyclist, automobile, tractor-trailer, etc. Examples of physical models may include, without limitation, constant velocity models, constant acceleration models, or the like. Different types of physical models (or mover models) and methods for selecting a suitable physical model are described in, for example, U.S. patent Application Publication No. 2022/016526, the disclosure of which is incorporated into this document by reference.

The system may receive the predicted path from the machine learning model as well as the one or determined features of an object to select one or more physical models for calculating a future state characteristic for a future measurement (e.g., state characteristics at $t_1+1$, $t_1+2$ ... $t_1+t_2$). For example, if a surrounding vehicle, as a classified object, is predicted to be traveling at a constant speed at $t_1$, a constant speed model may be selected. If the surrounding vehicle is at a constant speed at a measurement $t_1$ but is predicted to accelerate at $t_1+1$, then a combination of constant speed and constant acceleration models may be used for predicting the state at $t_1+2$.

In certain embodiments, the machine learning model and the physical model are deployed on-board the AV to output predictions in real-time. In certain such embodiments, the machine learning model may be selectively disabled, bypassed, or not used for making predictions under certain situations in order to maintain a desired accuracy and/or runtime computational efficiency (based on time/memory constraints). In such examples, the physical model may be used by itself for making predictions. Such situations may be learned based on a priori knowledge and/or observations regarding inefficiencies, inaccuracies, etc. of a machine learning model. For example, the machine learning model may be bypassed when it has limited training, data, or metrics to handle situations such as, without limitation, environmental factors such as stop signs, traffic signs, etc.; slow moving objects; certain brake targets; reference path following; or the like. Specifically, the machine learning model may be bypassed for, for example, objects moving with a linear velocity that is less than a threshold (e.g., about 2-5 m/s), for objects that have an upcoming brake target that is within a threshold distance (e.g., about 20-40 meters), for objects whose predicted trajectory or path diverges from a reference path by more than a threshold amount (e.g., about 2-5 meters offset and/or about 0.6-to about 0.8 radial deviation), or the like.

At 310, the system may use the state and/or path predictions from the machine learning model and/or the physical model at different time steps for motion planning of the AV, and control navigation of the AV through the environment.

The predictions (e.g., state and/or trajectory predictions) generated during method 300 can be used by a mobile platform such as that of an autonomous vehicle for general scene understanding, platform trajectory generation, and/or collision avoidance. A block diagram is provided in FIG. 4 that is useful for understanding how platform control is achieved in accordance with the object related information estimated based on the modified image. All or some of the operations performed in FIG. 4 can be performed by the on-board computing device of a mobile platform (e.g., 122 in FIG. 1) and/or a remote computing device (e.g., 110 of FIG. 1).

Figure 4:
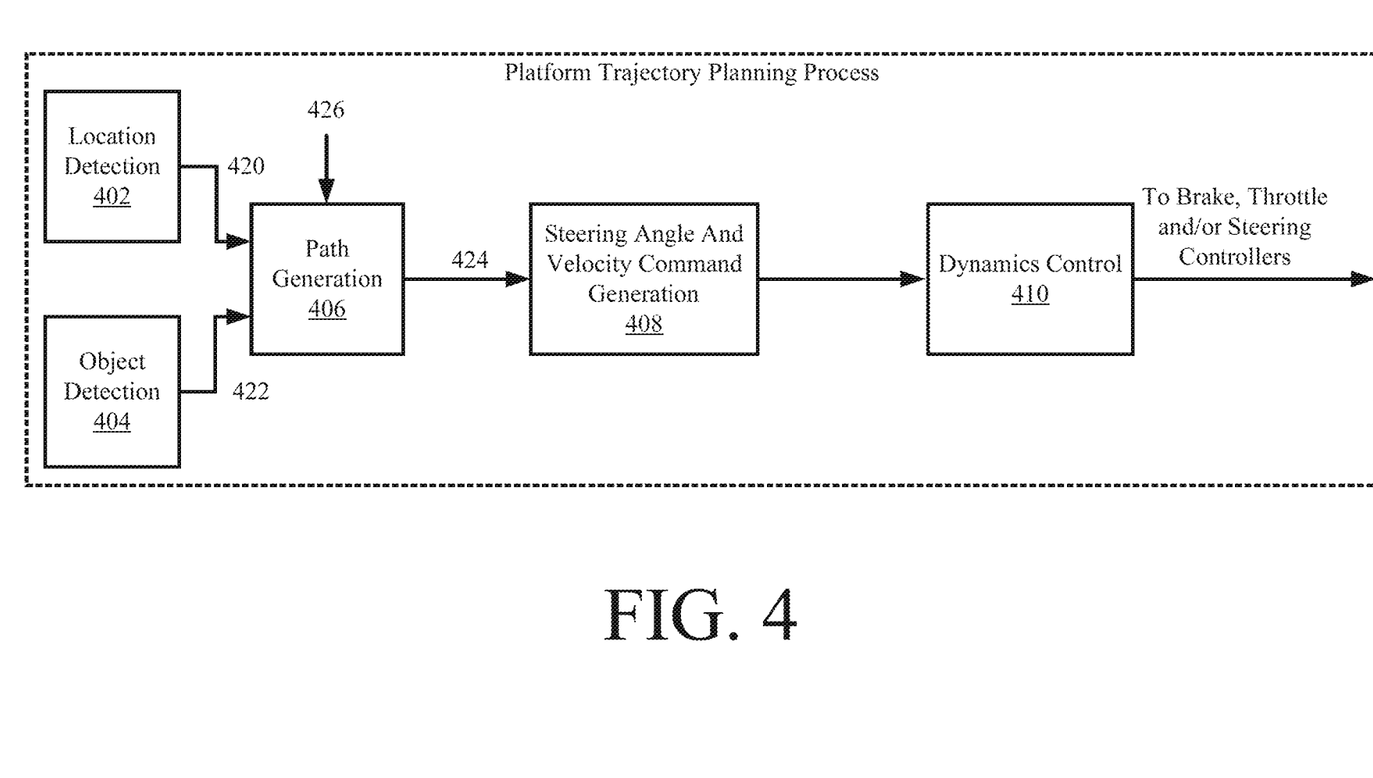
FIG. 4 provides a block diagram that is useful for understanding how a robotic system (e.g., an autonomous vehicle) is controlled in accordance with the present solution.

In block 402, a location of the mobile platform is detected by a processor that is onboard or offboard the mobile platform. This detection can be made based on sensor data output from a location sensor (for example, location sensor 260 of FIG. 2) of the vehicle. This sensor data can include, but is not limited to, GPS data. Information 420 specifying the detected location of the mobile platform is then passed block 406.

In block 404, an object is detected within proximity of the mobile platform. This detection is made based on sensor data output from one or more sensors (for example, sensor(s) 260-268 of FIG. 2) of the mobile platform. Information about the detected object is passed to block 406. This information includes, but is not limited to, object classification, object location, a speed of the object and/or a direction of travel of the object.

In block 406, a platform trajectory is generated using the information from blocks 402 and 404. Techniques for determining a platform trajectory are well known in the art. Any known or to be known technique for determining a platform trajectory can be used herein without limitation. For example, in some scenarios, such a technique involves determining a trajectory for the mobile platform that would pass the object when the object is in front of the mobile platform, the object has a heading direction that is aligned with the direction in which the mobile platform is moving, and the object has a length that is greater than a threshold value. The present solution is not limited to the particulars of this scenario. The platform trajectory 424 can be determined based on the information 420, prediction information relating to one or more objects in the environment of the mobile platform 422, and/or a road map 426 which is pre-stored in a datastore of the mobile platform. The platform trajectory 424 may represent a smooth path that does not have abrupt changes that would otherwise provide passenger discomfort. For example, the platform trajectory is defined by a path of travel along a given lane of a road in which the object is not predicted travel within a given amount of time. The platform trajectory 424 is then provided to block 508.

The prediction information 422 can include, but is not limited to, an object classification, the object's actual speed, the object's actual direction of travel, possible direction(s) of travel, and/or possible object trajectory(ies). The prediction information 422 can also include, but is not limited to, trajectory prediction(s) for one or more objects made using the systems and methods of this disclosure.

In block 408, a steering angle and velocity command is generated based on the platform trajectory 424. The steering angle and velocity command are provided to block 410 for dynamics control.

The mobile platform also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

Notably, this document describes the present solution in the context of an autonomous vehicle. However, the present solution is not limited to autonomous vehicle applications. The present solution may be used in other applications such as robotic applications, radar system applications, metric applications, and/or system performance applications.

Figure 5:
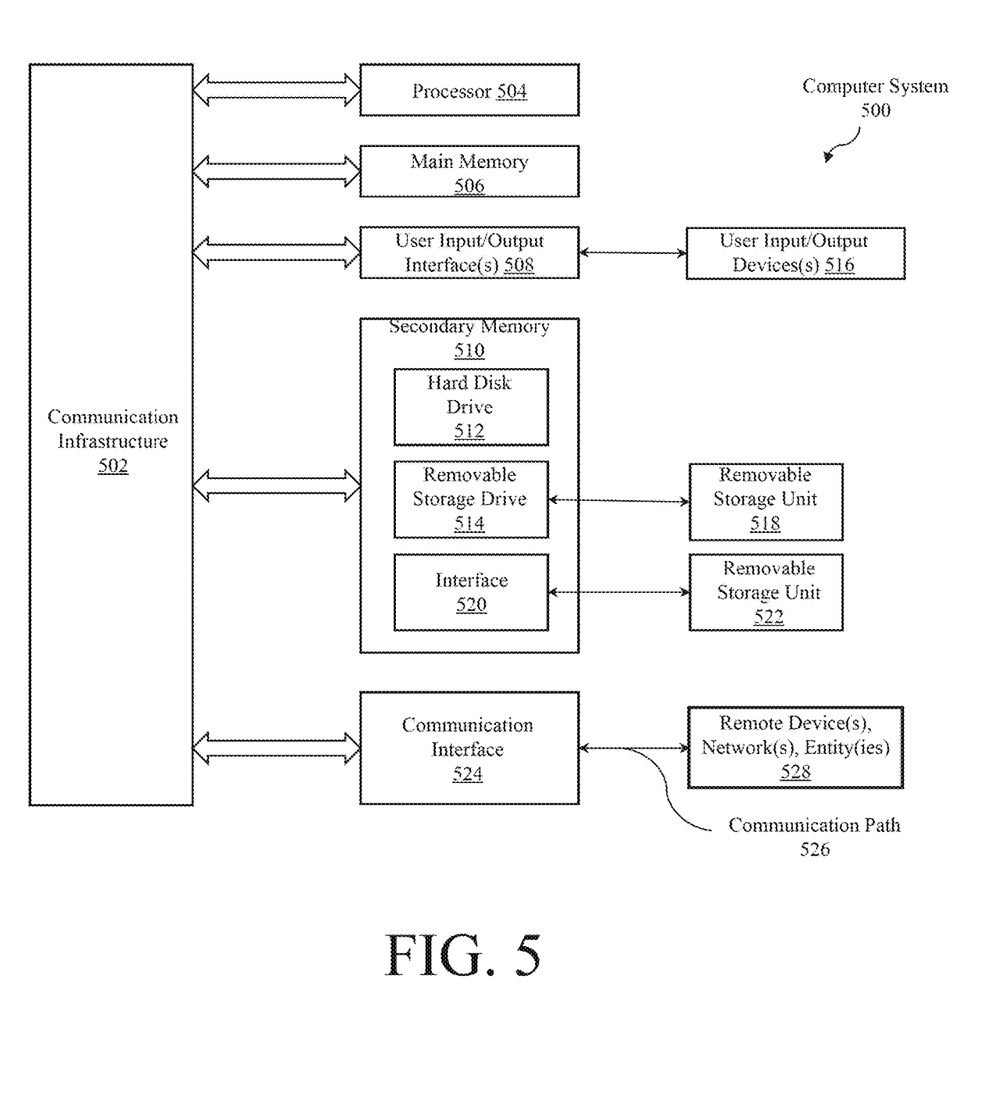
FIG. 5 is a block diagram that illustrates various elements of a possible electronic subsystem of an autonomous vehicle and/or external electronic device.

Various embodiments can be implemented, for example, using one or more computer systems, such as computer system 500 shown in FIG. 5. Computer system 500 can be any computer capable of performing the functions described in this document.

Computer system 500 includes one or more processors (also called central processing units, or CPUs), such as a processor 504. Processor 504 is connected to a communication infrastructure or bus 502. Optionally, one or more of the processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 516, such as monitors, keyboards, pointing devices, etc., that communicate with communication infrastructure 502 through user input/output interface(s) 508.

Computer system 500 also includes a main or primary memory 506, such as random access memory (RAM). Main memory 506 may include one or more levels of cache. Main memory 506 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 514 reads from and/or writes to removable storage unit 518 in a well-known manner.

According to an example embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In some embodiments, a tangible, non-transitory apparatus, or article of manufacture comprising a tangible, non-transitory computer useable or readable medium having control logic (software) stored thereon is also referred to in this document as a computer program product or program storage device. This includes, but is not limited to, computer system 500, main memory 506, secondary memory 510, and removable storage units 518 and 522, as well as tangible articles of manufacture embodying any combination of the foregoing. Such control logic, when executed by one or more data processing devices (such as computer system 500), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described in this document. The features from different embodiments disclosed herein may be freely combined. For example, one or more features from a method embodiment may be combined with any of the system or product embodiments. Similarly, features from a system or product embodiment may be combined with any of the method embodiments herein disclosed.

As described above, this document discloses system, method, and computer program product embodiments for generating trajectories for a vehicle are disclosed. The computer program embodiments include programming instructions (e.g., stored in a memory), to cause a processor to perform the autonomous vehicle navigation methods described in this document. The system embodiments also include a processor which is configured to perform the autonomous vehicle navigation methods described in this document, e.g., via the programming instructions. More generally, the system embodiments include a system comprising means to perform the steps of the any of the methods described in this document.

In various embodiments, the methods may include generating first predicted states of an object in an environment of the vehicle at one or more first time steps during a first prediction horizon using a machine learning model and sensor data about the environment. The first predicted states may then be used as an input to a physical model to generate second predicted states of the object at one or more second time steps during a second prediction horizon where the one or more second time steps are after the one or more first time steps. A trajectory for the vehicle may be generated using the first predicted states or the second predicted states of the object. Optionally, the machine learning model may be a deep learning model.

In various embodiments, the methods may also include receiving the sensor data, and determining one or more features of the object based on the sensor data. The features can include past or current observed states of the object.

Optionally, in any of the above embodiments, the first predicted states of the object may include at least a predicted path of the object during the first prediction horizon.

In any of the above embodiments, the methods may also include selecting the physical model from a plurality of physical models based on one or more features of the object.

In any of the above embodiments, the first prediction horizon may be about 4-12 seconds.

In any of the above embodiments, the second prediction horizon may be about 8-15 seconds.

In any of the above embodiments, the methods may also include determining a reference path for the object.

In any of the above embodiments, the methods may also include selectively disabling the machine learning model, and generating a third predicted state of the object using the physical model and sensor data about an environment, Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," and the like each refer to a non-transitory device on which computer-readable data, programming instructions or both are stored. The terms "storage," "storage device," and "disk storage" specifically refer to a non-transitory device, such as a hard drive (HDD) or solid-state drive (SDD), that stores data persistently for a relatively longer period. The term "memory" may be used generally in this document to refer either to a storage device that stores information on a persistent basis, or to a device that stores information on a non-persistent basis such as a random access memory (RAM) device. Except where specifically stated otherwise, the terms "memory," "memory device," "storage," "disk storage," "storage device" and the like are intended to include single device embodiments, embodiments in which multiple devices together or collectively store a set of data or instructions, as well as individual sectors within such devices. A "storage location" is a segment, sector, or portion of a storage device. The relative terms "first storage location" and "second storage location" refer to different storage locations, which may be elements of a single device or elements of multiple devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices which may be components of a single device or components of separate devices, together or collectively perform a process.

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

The term "object," when referring to an object that is detected by a vehicle perception system or simulated by a simulation system, is intended to encompass both stationary objects and moving (or potentially moving) objects, except where specifically stated otherwise by use of the term "object" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an object that a vehicle's perception or prediction systems may generate refers to the predicted path that the object will follow over a time horizon, along with the predicted speed of the object and/or position of the object along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The features from different embodiments disclosed herein may be freely combined. For example, one or more features from a method embodiment may be combined with any of the system or product embodiments. Similarly, features from a system or product embodiment may be combined with any of the method embodiments herein disclosed.

The breadth and scope of this disclosure should not be limited by any of the above-described example embodiments but should be defined only in accordance with the following claims and their equivalents.

As described above, this document discloses system, method, and computer program product embodiments for generating vehicle trajectories. The system embodiments include a processor or computing device implementing the methods for generating vehicle trajectories. The computer program embodiments include programming instructions, for example, stored in a memory, to cause a processor to perform the methods described in this document. The system embodiments also include a processor which is configured to perform the methods described in this document, for example, via the programming instructions. More generally, the system embodiments include a system comprising means to perform the steps of any of the methods described in this document.

Without excluding further possible embodiments, certain example embodiments are summarized in the following clauses.

Clause 1. A method for planning a trajectory for a vehicle, the method comprising, by a processor:
  generating, using a machine learning model and sensor data about an environment, first predicted states of an object at one or more first time steps during a first prediction horizon;
  using the first predicted states of the object as an input to a physical model to generate second predicted states of the object at one or more second time steps during a second prediction horizon, the one or more second time steps being after the one or more first time steps; and
  generating, using the first predicted states or the second predicted states of the object, the trajectory for the vehicle.

Clause 2. The method of clause 1, further comprising:
  receiving the sensor data; and
  determining, based on the sensor data, one or more features of the object, the one or more features comprising past or current observed states of the object.

Clause 3. The method of any of the above clauses, wherein the first predicted states of the object comprise at least a predicted path of the object during the first prediction horizon.

Clause 4. The method of any of the above clauses, further comprising selecting, based on one or more features of the object, the physical model from a plurality of physical models.

Clause 5. The method of any of the above clauses, wherein the first prediction horizon is about 4-12 seconds.

Clause 6. The method of any of the above clauses, wherein the second prediction horizon is about 8-15 seconds.

Clause 7. The method of any of the above clauses, further comprising determining a reference path for the object.

Clause 8. The method of any of the above clauses, further comprising:
  selectively disabling the machine learning model; and
  generating, using the physical model and sensor data about an environment, a third predicted state of the object.

Clause 9. The method of any of the above clauses, wherein the machine learning model is a deep learning model.

Clause 10. A system comprising means for performing steps of any of the above method clauses.

Clause 11. A computer program, or a storage medium storing the computer program, comprising instructions, which when executed by one or more suitable processors cause any of the processors to perform the steps of any of the above method clauses.

Clause 12. A system for planning a trajectory for a vehicle, the system comprising:
  at least one processor;
  programming instructions stored in a memory and configured to cause the processor to:
  generate, using a machine learning model and sensor data about an environment, first predicted states of an object at one or more first time steps during a first prediction horizon;
  use the first predicted states of the object as an input to a physical model to generate second predicted states of the object at one or more second time steps during a second prediction horizon, the one or more second time steps being after the one or more first time steps; and
  generate, using the first predicted states or the second predicted states of the object, the trajectory for the vehicle.

Clause 13. The system of clause 12, further comprising programming instructions configured to cause the processor to:
  receive the sensor data; and
  determine, based on the sensor data, one or more features of the object, the one or more features comprising past or current observed states of the object.

Clause 14. The system of any of the above clauses, wherein the first predicted states of the object comprise at least a predicted path of the object during the first prediction horizon.

Clause 15. The system of any of the above clauses, further comprising programming instructions configured to cause the processor to select, based on one or more features of the object, the physical model from a plurality of physical models.

Clause 16. The system of any of the above clauses, wherein the first prediction horizon is about 4-12 seconds.

Clause 17. The system of any of the above clauses, wherein the second prediction horizon is about 8-15 seconds.

Clause 18. The system of any of the above clauses, further comprising programming instructions configured to cause the processor to determine a reference path for the object.

Clause 19. The system of any of the above clauses, further comprising programming instructions configured to cause the processor to:
  selectively disable the machine learning model; and
  generate, using the physical model and sensor data about an environment, a third predicted state of the object.

Clause 20. The system of any of the above clauses, wherein the machine learning model is a deep learning model.

Clause 21. A computer program product comprising a non-transitory computer-readable medium that stores instructions that, when executed by a computing device, will cause the computing device to perform operations comprising:
  generating, using a machine learning model and sensor data about an environment, first predicted states of an object at one or more first time steps during a first prediction horizon;
  using the first predicted states of the object as an input to a physical model to generate second predicted states of the object at one or more second time steps during a second prediction horizon, the one or more second time steps being after the one or more first time steps; and
  generating, using the first predicted states or the second predicted states of the object, a trajectory for a vehicle.

Clause 22. The computer program product of clause 21, further comprising instructions to perform operations comprising:
  receiving the sensor data; and
  determining, based on the sensor data, one or more features of the object, the one or more features comprising past or current observed states of the object.

The invention claimed is:

1. A method for planning a trajectory for a vehicle, the method comprising, by a processor:
  generating, using a machine learning model and sensor data about an environment, first predicted states of an object at one or more first time steps during a first prediction horizon;
  using the first predicted states of the object as an input to a physical model to generate second predicted states of the object at one or more second time steps during a second prediction horizon, the one or more second time steps being after the one or more first time steps;
  generating, using the first predicted states or the second predicted states of the object, the trajectory for the vehicle; and
  controlling the vehicle to traverse the environment using the trajectory generated.

2. The method of claim 1, further comprising:
  receiving the sensor data; and
  determining, based on the sensor data, one or more features of the object, the one or more features comprising past or current observed states of the object.

3. The method of claim 1, wherein the first predicted states of the object comprise at least a predicted path of the object during the first prediction horizon.

4. The method of claim 1, further comprising selecting, based on one or more features of the object, the physical model from a plurality of physical models.

5. The method of claim 1, wherein the first prediction horizon is about 4-12 seconds.

6. The method of claim 1, wherein the second prediction horizon is about 8-15 seconds.

7. The method of claim 1, further comprising determining a reference path for the object.

8. The method of claim 1, further comprising:
selectively disabling the machine learning model; and
generating, using the physical model and sensor data about an environment, a third predicted state of the object.

9. The method of claim 1, wherein the machine learning model is a deep learning model.

10. A system for planning a trajectory for a vehicle, the system comprising:
at least one processor;
programming instructions stored in a memory and configured to cause the processor to:
generate, using a machine learning model and sensor data about an environment, first predicted states of an object at one or more first time steps during a first prediction horizon;
use the first predicted states of the object as an input to a physical model to generate second predicted states of the object at one or more second time steps during a second prediction horizon, the one or more second time steps being after the one or more first time steps;
generate, using the first predicted states or the second predicted states of the object, the trajectory for the vehicle; and
control the vehicle to traverse the environment using the trajectory generated.

11. The system of claim 10, further comprising programming instructions configured to cause the processor to:
receive the sensor data; and
determine, based on the sensor data, one or more features of the object, the one or more features comprising past or current observed states of the object.

12. The system of claim 10, wherein the first predicted states of the object comprise at least a predicted path of the object during the first prediction horizon.

13. The system of claim 10, further comprising programming instructions configured to cause the processor to select, based on one or more features of the object, the physical model from a plurality of physical models.

14. The system of claim 10, wherein the first prediction horizon is about 4-12 seconds.

15. The system of claim 10, wherein the second prediction horizon is about 8-15 seconds.

16. The system of claim 10, further comprising programming instructions configured to cause the processor to determine a reference path for the object.

17. The system of claim 10, further comprising programming instructions configured to cause the processor to:
selectively disable the machine learning model; and
generate, using the physical model and sensor data about an environment, a third predicted state of the object.

18. The system of claim 10, wherein the machine learning model is a deep learning model.

19. A computer program product comprising a non-transitory computer-readable medium that stores instructions that, when executed by a computing device, will cause the computing device to perform operations comprising:
generating, using a machine learning model and sensor data about an environment, first predicted states of an object at one or more first time steps during a first prediction horizon;
using the first predicted states of the object as an input to a physical model to generate second predicted states of the object at one or more second time steps during a second prediction horizon, the one or more second time steps being after the one or more first time steps;
generating, using the first predicted states or the second predicted states of the object, a trajectory for a vehicle; and
controlling the vehicle using the trajectory generated.

20. The computer program product of claim 19, further comprising instructions to perform operations comprising:
receiving the sensor data; and
determining, based on the sensor data, one or more features of the object, the one or more features comprising past or current observed states of the object.

* * * * *